(12) United States Patent
Sanders et al.

(10) Patent No.: US 8,069,419 B2
(45) Date of Patent: Nov. 29, 2011

(54) GRAPHICAL USER INTERFACE CHECK-LIST BUTTON CONTROL AND METHOD

(75) Inventors: Roger Everette Sanders, Fuquay-Varina, NC (US); Thomas Warren Cox, Holly Springs, NC (US)

(73) Assignee: SAS Institute Inc., Cary, NC (US)

( * ) Notice: Subject to any disclaimer, the term of this patent is extended or adjusted under 35 U.S.C. 154(b) by 861 days.

(21) Appl. No.: 09/837,047

(22) Filed: Apr. 18, 2001

(65) Prior Publication Data

US 2002/0154166 A1   Oct. 24, 2002

(51) Int. Cl.
*G06F 3/048* (2006.01)
(52) U.S. Cl. ........ 715/828; 715/845; 715/811; 715/826; 715/810; 715/765
(58) Field of Classification Search .................. 345/828, 345/845, 811, 826, 841–843, 810, 765, 866; 395/161; 715/828, 845, 811, 826, 810, 765
See application file for complete search history.

(56) References Cited

U.S. PATENT DOCUMENTS

| | | | |
|---|---|---|---|
| 4,769,772 A | 9/1988 | Dwyer | |
| 5,091,852 A | 2/1992 | Tsuchida et al. | |
| 5,317,687 A * | 5/1994 | Torres | 345/823 |
| 5,367,675 A | 11/1994 | Cheng et al. | |
| 5,418,950 A | 5/1995 | Li et al. | |
| 5,421,008 A | 5/1995 | Banning et al. | |
| 5,444,841 A | 8/1995 | Glaser et al. | |
| 5,450,538 A | 9/1995 | Glaser et al. | |
| 5,471,613 A | 11/1995 | Banning et al. | |
| 5,495,605 A | 2/1996 | Cadot | |
| 5,542,024 A * | 7/1996 | Balint et al. | 345/853 |
| 5,544,285 A | 8/1996 | Glaser et al. | |
| 5,548,755 A | 8/1996 | Leung et al. | |
| 5,615,361 A | 3/1997 | Leung et al. | |
| 5,644,737 A * | 7/1997 | Tuniman et al. | 715/810 |
| 5,659,728 A | 8/1997 | Bhargava et al. | |
| 5,668,966 A | 9/1997 | Ono et al. | |
| 5,668,987 A | 9/1997 | Schneider | |
| 5,696,960 A | 12/1997 | Bhargava et al. | |
| 5,713,020 A | 1/1998 | Reiter et al. | |
| 5,721,900 A | 2/1998 | Banning et al. | |
| 5,721,901 A | 2/1998 | Banning et al. | |
| 5,724,570 A | 3/1998 | Zeller et al. | |
| 5,760,776 A * | 6/1998 | McGurrin et al. | 345/841 |
| 5,761,657 A | 6/1998 | Hoang | |
| 5,774,123 A | 6/1998 | Matson | |
| 5,781,193 A * | 7/1998 | Alimpich et al. | 345/810 |
| 5,787,418 A | 7/1998 | Hibbetts et al. | |

(Continued)

OTHER PUBLICATIONS

Microsoft Corp. Microsoft Outlook 2000. Screenshots attached. 12 Figures, 12 pages.*

(Continued)

*Primary Examiner* — Michael Roswell
(74) *Attorney, Agent, or Firm* — Jones Day

(57) ABSTRACT

A computer-implemented method and system are provided for modifying a data list by a user within a graphical user interface. A first control is provided that operates within the graphical user interface. The first control is manipulated in order to access a second control. The second control includes the data list and allows modification of the data list after the second control is accessed.

34 Claims, 19 Drawing Sheets

U.S. PATENT DOCUMENTS

| | | | |
|---|---|---|---|
| 5,801,703 A * | 9/1998 | Bowden et al. | 345/841 |
| 5,819,255 A | 10/1998 | Celis et al. | |
| 5,822,747 A | 10/1998 | Graefe et al. | |
| 5,822,750 A | 10/1998 | Jou et al. | |
| 5,835,712 A | 11/1998 | DuFresne | |
| 5,855,012 A | 12/1998 | Bhargava et al. | |
| 5,864,840 A | 1/1999 | Leung et al. | |
| 5,867,157 A * | 2/1999 | Goddard et al. | 345/762 |
| 5,909,684 A | 6/1999 | Nelson | |
| 5,913,205 A | 6/1999 | Jain et al. | |
| 5,937,401 A | 8/1999 | Hillegas | |
| 5,937,415 A * | 8/1999 | Sheffield et al. | 707/204 |
| 5,940,078 A * | 8/1999 | Nagarajayya et al. | 715/859 |
| 5,960,427 A | 9/1999 | Goel et al. | |
| 5,963,938 A | 10/1999 | Wilson et al. | |
| 5,963,952 A | 10/1999 | Smith | |
| 5,966,126 A | 10/1999 | Szabo | |
| 5,982,367 A * | 11/1999 | Alimpich et al. | 345/810 |
| 6,021,405 A | 2/2000 | Celis et al. | |
| 6,031,836 A | 2/2000 | Haserodt | |
| 6,032,143 A | 2/2000 | Leung et al. | |
| 6,044,382 A | 3/2000 | Martino | |
| 6,111,574 A | 8/2000 | Meek | |
| 6,133,915 A * | 10/2000 | Arcuri et al. | 715/779 |
| 6,137,488 A | 10/2000 | Kraft et al. | |
| 6,208,340 B1 * | 3/2001 | Amin et al. | 345/808 |
| 6,208,985 B1 | 3/2001 | Krehel | |
| 6,229,538 B1 | 5/2001 | McIntyre et al. | |
| 6,253,195 B1 | 6/2001 | Hudis et al. | |
| 6,275,801 B1 | 8/2001 | Novak et al. | |
| 6,275,818 B1 | 8/2001 | Subramanian et al. | |
| 6,295,517 B1 | 9/2001 | Roy et al. | |
| 6,295,531 B1 | 9/2001 | Bae et al. | |
| 6,326,962 B1 | 12/2001 | Szabo | |
| 6,362,836 B1 | 3/2002 | Shaw et al. | |
| 6,434,545 B1 | 8/2002 | MacLeod | |
| 6,448,985 B1 * | 9/2002 | McNally | 715/784 |
| 6,546,393 B1 * | 4/2003 | Khan | 1/1 |
| 2004/0001109 A1 | 1/2004 | Blancett et al. | |

OTHER PUBLICATIONS

Habraken, Joe. "Sams Teach Yourself Microsoft Outlook 2000 in 10 Minutes". 1999, Sams Publishing. pp. 126-131.*

Microsoft Windows User Experience, Official Guidelines for User Interface Developers and Designers, pp. 65-94 and 139-205 (1999).

* cited by examiner

| COMPONENT | EVENT | GENERATED BY | DESCRIPTION OF RESPONSE |
|---|---|---|---|
| CHECK-LIST BUTTON CONTROL | CLICKED | USER | IF THE CHECK-LIST BUTTON CONTROL PUSH-BUTTON IS ENALBLED. OPEN THE DETAIL WINDOW. |
| DETAIL WINDOW | ACTIVATION | SYSTEM | PREPARE THE DETAIL WINDOW FOR DISPLAY BY POPULATING AND SETTING THE STATE OF ALL THE SUB-COMPONENTS. |
| EXPANSION BUTTON | CLICKED | USER | RESIZE THE DETAIL WINDOW TO DISPLAY OR HIDE THE EDITING GROUP BOX AND ITS CONTENTS. REDRAW THE EXPANSION BUTTON TO REFLECT ITS TOGGLED STATE. |
| ITEM ADD BUTTON | CLICKED | USER | INSERT THE TEXT FROM THE NEW ITEM TEXT BOX INTO THE LIST BOX AS A NEW LIST ITEM, IF IT IS VALID. |
| NEW ITEM TEXT BOX | TYPING | USER | AS THE NEW ITEM TEXT BOX CHANGES, THE ITEM ADD BUTTON WILL BE ENABLED IF THE TEXT IS VALID, AND DISABLED IF NOT. |
| LIST BOX | RIGHT-CLICKED | USER | ACTIVATE THE CONTEXT MENU. |
| DETAIL WINDOW | DRAW ITEM | SYSTEM | CHECK TO SEE IF IT IS THE EXPANSION BUTTON BEING REDRAWN. IF SO, PERFORM CUSTOM DRAWING STEPS, OTHERWISE DEFER TO DEFAULT CONTROL RENDERING. |
| CLOSE BUTTON | CLICKED | USER | CLOSE THE DETAIL WINDOW, SAVING ALL CHANGES. |
| CONTEXT MENU | ADD SELECTED | USER | EXPAND THE DETAIL WINDOW (IF NECESSARY) AND TRANSFER THE FOCUS TO THE NEW ITEM TEXT BOX. |
| CONTEXT MENU | DELETE SELECTED | USER | REMOVE THE CURRENT SELECTION FROM THE LIST BOX. |
| CONTEXT MENU | RENAME SELECTED | USER | ACTIVATE IN-PLACE LABEL EDITING FOR THE CURRENT SELECTION. |
| LIST BOX | CHANGED | SYSTEM | SINCE THE CONTENTS OF THE LIST BOX HAVE CHANGED, (AS AN INDIRECT RESULT OF USER ACTION,) MAKE SURE THAT THERE IS A VALID CURRENT SELECTION. |
| LIST BOX | KEY PRESS | USER | IF THE USER PRESSED THE DELETE KEY, REMOVE THE CURRENT SELECTION FROM THE LIST BOX, OTHERWISE DEFER TO DEFAULT KEY PRESS HANDLING. |
| LIST BOX ITEM | EDITING COMPLETED | USER | CHECK TO ENSURE THE MODIFIED ITEM LABEL IS VALID. IF SO, CONTINUE WITH DEFAULT HANDLING. OTHERWISE RESET THE LABEL AND NOTIFY THE USER. |

*Fig. 3*

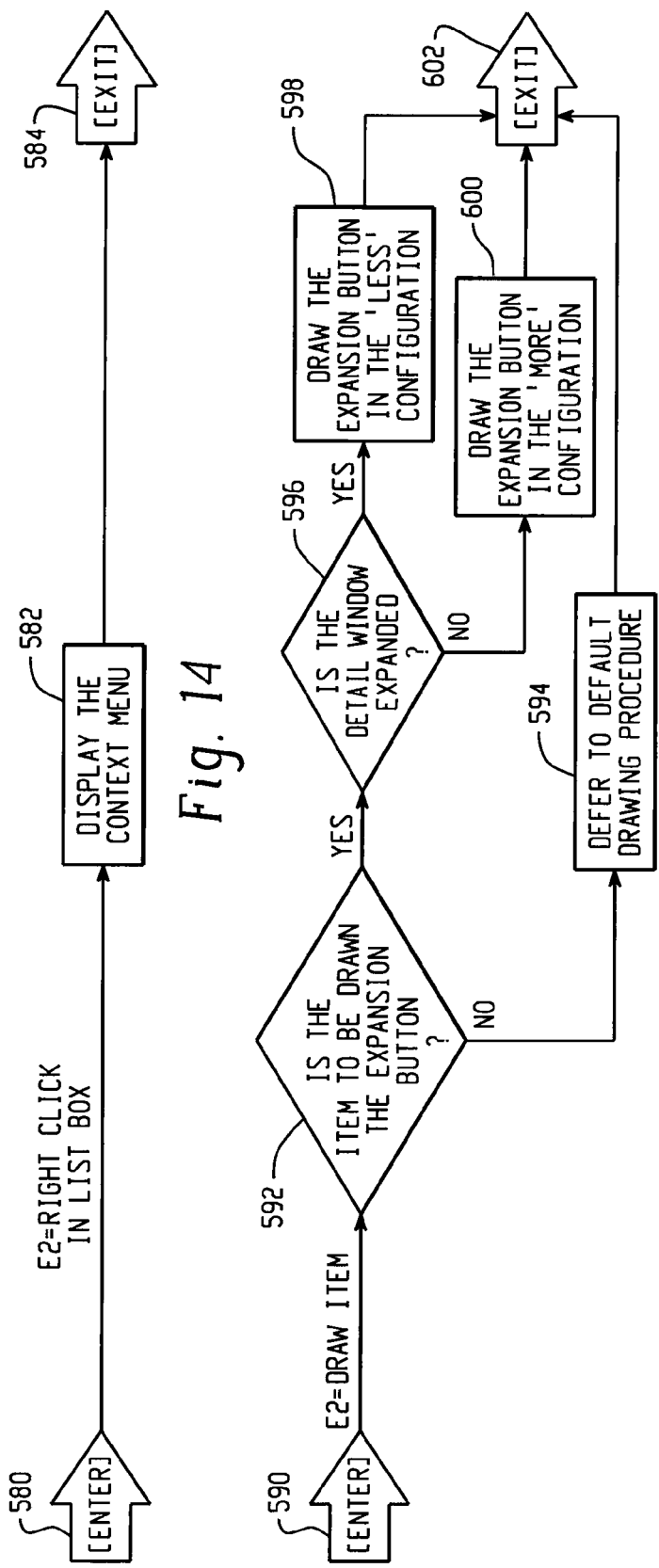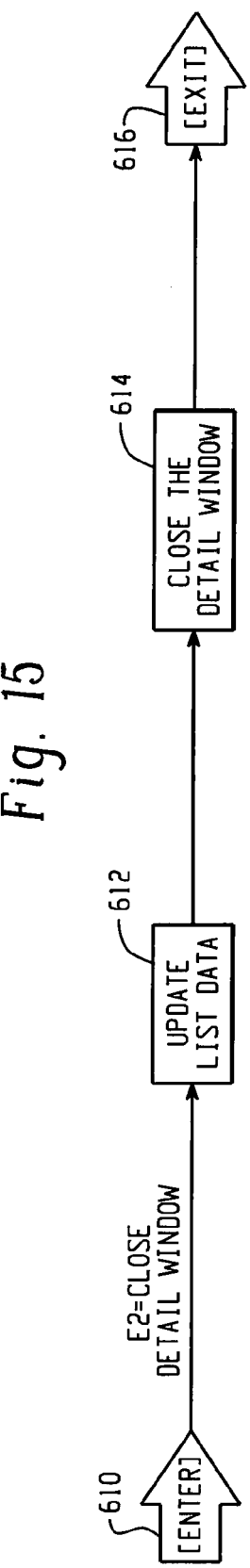

GRAPHICAL USER INTERFACE CHECK-LIST BUTTON CONTROL AND METHOD

BACKGROUND

1. Technical Field

The present invention is directed to the field of computer-implemented graphical user interfaces. More specifically, the present invention relates to user controls on graphical user interfaces.

2. Description of the Related Art

In the past, computer display functionality was limited because the display hardware and software were not capable of more than basic input and output. Such basic interfaces serially prompted the user for data, and then would display calculation results derived from the prompted data. The user typically could not branch off in mid-stream of entering data to see other views of the data and then return to the original point.

In contrast to past computer display functionality, the currently popular windowing graphical user interfaces (GUIs) present users with a large amount of information at one time. Today's GUIs are crowded with information that not infrequently overwhelms the user. Consequently, today's developer must balance the presentability of the information with the amount of information desired to be seen.

To further compound the problem for today's interface developers, interface developers typically must address limited display space requirements because of the size of computer screens (e.g. PDAs and laptops). Among existing graphical user interface controls, the developers could use multiple screens to display an entire list, thus causing the user to navigate through those additional screens in order to make selections from the list, or lists. This can sometimes result in a confusing situation for a user who wishes to input and view data.

SUMMARY

The present invention overcomes the aforementioned disadvantages as well as others. In accordance with the teachings of the present invention, a computer-implemented method and system are provided for modifying a data list by a user within a graphical user interface. A first control is provided that operates within the graphical user interface. The first control is manipulated in order to access a second control. The second control includes the data list and allows modification of the data list after the second control is accessed.

Further areas of applicability of the present invention will become apparent from the detailed description provided hereinafter. It should be understood however that the detailed description and specific examples, while indicating preferred embodiments of the invention, are intended for purposes of illustration only, because various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a table illustrating exemplary events involving the present invention;

FIGS. 10-22 are flowcharts depicting steps used by the present invention to handle different interface-related events.

DETAILED DESCRIPTION OF THE PREFERRED EMBODIMENT

Figure 1:
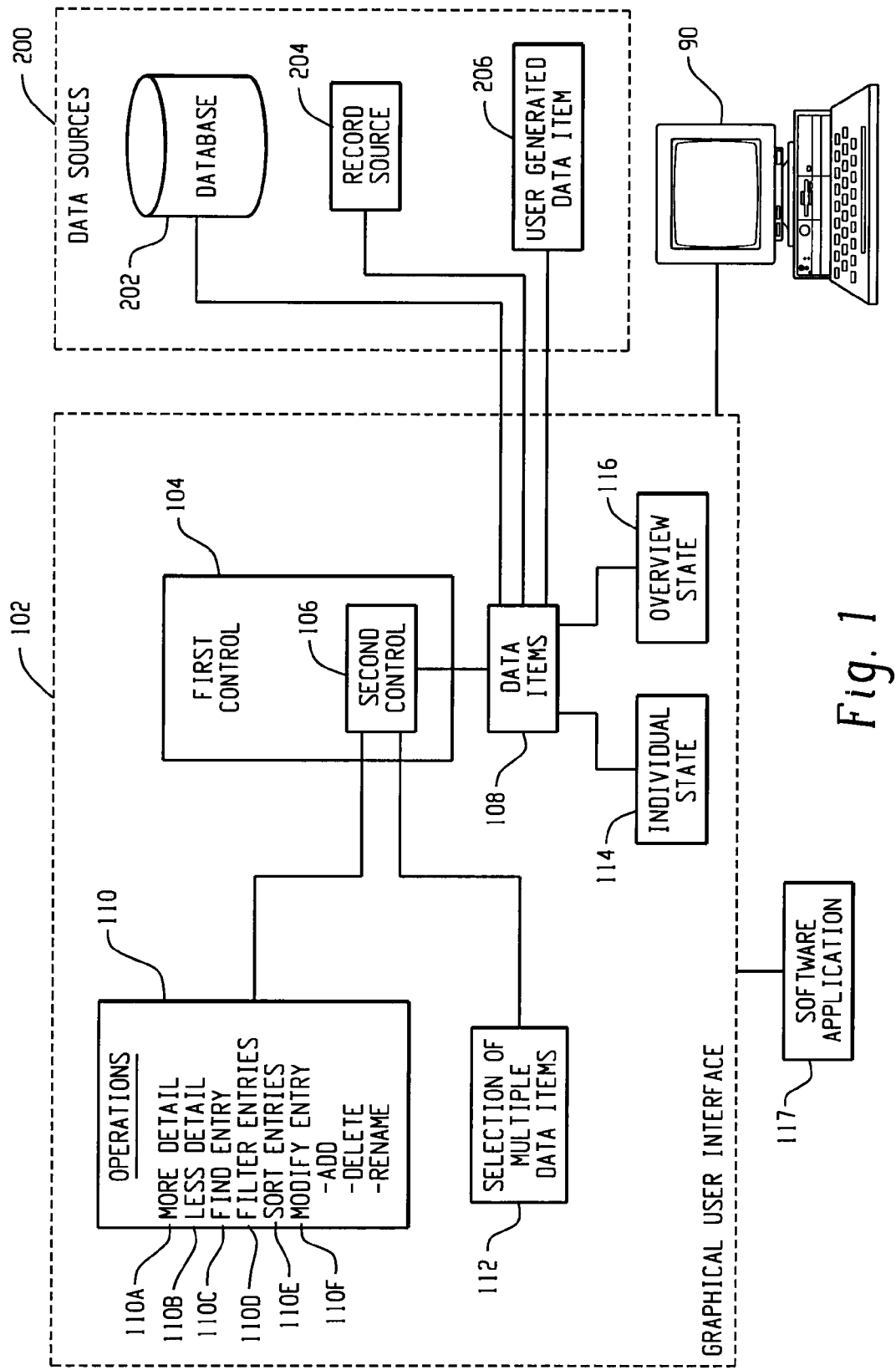
FIG. 1 is a system block diagram depicting exemplary computer and software components used by the present invention to manage data.

FIG. 1 depicts the system of the present invention for modifying data items 108 within a graphical user interface 102. The graphical user interface 102 is displayed to a user via computer 90. Through the graphical user interface 102, the user accesses controls (104, 106) within the graphical user interface 102. After the controls (104, 106) are accessed by the user, the data items 108 may be modified. Such modifications may include changing the names, labels, or states of the data items 108. Also, modifications may include adding new data items 108 or deleting existing data items 108 via the controls (104, 106).

The controls (104, 106) of the present invention achieve these and other types of modifications in an ergonomic manner that uses a reduced amount of screen space. To accomplish this, the present invention includes the second control 106 within the first control 104. Manipulation of the first control 104 provides access to the second control 106. After manipulation of the first control box, the second control 106 becomes visible to the user.

It is noted that a control is a graphical interface object, such as a check box, a command button, or some other GUI item that can be placed in a computer window or form and allows a user to perform an action on the data items 108. It should also be understood that the term window is to be broadly construed and may contain its own menu, message, and set of controls. In a window environment, the screen may be divided into several windows, each with their own boundaries. The user may enlarge, shrink, and move individual windows at will. In some instances, windows may be opened side-by-side and in other instances opened windows can overlap one another.

The second control 106 includes the data items 108 and allows modifications and manipulations of the data items 108 through operations 110. Examples of the operations 110 include: a "show more" detail operation 110A, a "show less" detail operation 110B, a find entries operation 110C, a filter entries operation 110D, a sort entries operation 110E, and a modify entries operation 110F.

The show more detail operation 110A allows the user to access one or more additional operations 110 by expanding the second control's window to contain the additional operation(s) 110. The show less detail operation 110B reverses the show more detail operation 110A by contracting the second control's window such that the additional operation(s) 110 are not displayed. The find entry operation 110C allows the user to search through a list of data items 108 for the data items specified by the user. The filter entries operation 110D allows the user to only display those data items 108 that match a search criteria specified by the user. The sort entries operation 110E allows the user to sort the data items 108 alphabetically or numerically and in ascending or descending order.

The modify data item operation 11 OF modifies the data items 108 to add a new data entry to the data items 108, or delete an entry from the data items 108, or rename the labels of the data items 108. The second control 106 allows multiple data items 108 to be selected either individually or as a group (as indicated by reference numeral 112). After one or more of the data items 108 have been selected, the modify data item operation 110F may be performed upon the selected data items 108.

The second control 106 may further provide an individual data entry state indicator 114 proximate to each of the data items 108. The individual state indicator 114 depicts whether a data item has been selected for use by a data processing software application 117 running the graphical user interface 102. In this way, there is a distinction between the user selecting data items 108 for modification and the user selecting (i.e., checking) the data items 108 for processing by the software application 117. As an example of the first type, the user may select multiple data items 108 in order to delete them through a single delete modification operation. As an example of the second type, the user may manipulate the state indicator 114 of the data items 108 so that the application may know which data items 108 are to be processed by the software application 117.

The first control 104 may provide a state overview indicator 116 for the second control 106. The state overview indicator 116 indicates to the user (when the second control is hidden) as to whether any or all of the data items 108 have been selected within the second control 106 for use by the software application 117.

The data items 108 may originate from one or more data sources 200. The data sources 200 may include a database 202, a record source 204, or user generated data items 206. The database 202 may be a collection of data that is organized so that its data content can easily be accessed, managed, and updated through such database commands as SQL commands. Record source 204 includes data that exist on a data field on a computer form. User generated data items 206 include the user entering new data items after activating the first control 104. The user may enter user generated data items 206, for example, by the add operation of the modify data item operation 110F.

Figure 2:
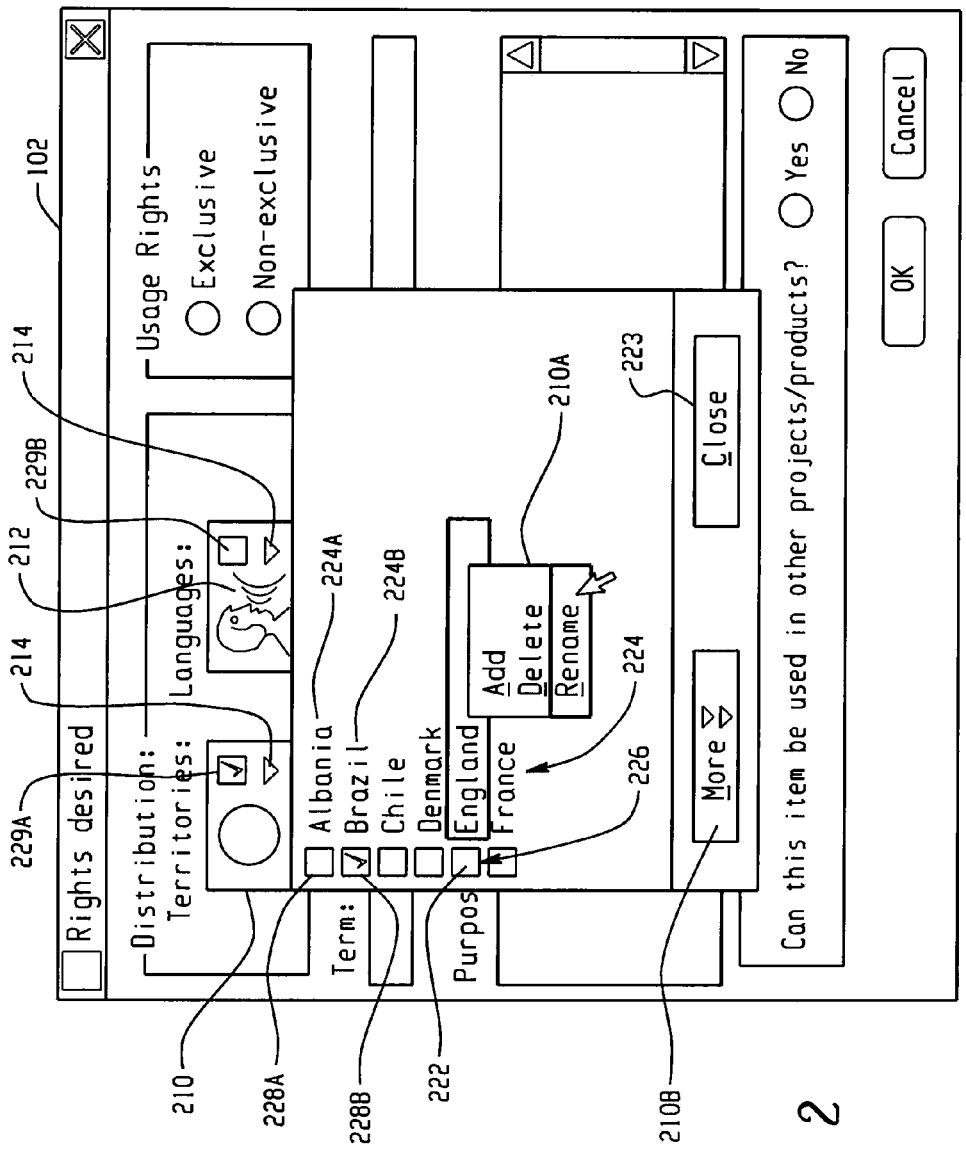
FIG. 2 is a graphical user interface depicting an exemplary check-list button control of the present invention.

A graphical representation of an embodiment of the present invention is shown in FIG. 2. The graphical user interface 102 allows the user to select one or more data items 108 by modifying the state of a check box 228A, 228B. The semantics of the selections 112 are determined by the software application 117. The graphical user interface 102 shows a first control 210 that handles territory-related items represented by a pull-down territories control button. Another first control 212 is represented by a pull-down language control button. The pull-down capability of the buttons, 210 and 212, for displaying a second control is indicated by inverted triangles 214. The territories button 210 is depicted in an expanded condition, showing a corresponding territories check-list detail window 222 that contains a territories second control 224.

Due to space limitations resulting from screen size and other reasons, it is sometimes possible that not all data items 226 populating the second control 224 can be simultaneously displayed in the check-list detail window 222. Also, additional controls for modifying the second control 224 may be hidden until needed, thereby saving even more screen space.

The territories second control 224 contains multiple data items 226 such as, an Albania data item 224A, a Brazil data item 224B, and other territory-related data items. An Albania check-list box 228A is shown proximate to the Albania data item 224A, and a Brazil check-list box 228B is shown proximate to the Brazil data item 224B. The Albania check-list box 228A is not checked indicating that it is not selected for data processing by the software application. The Brazil check-list box 228B is checked indicating that it is selected for processing.

The territories button 210 includes an overview state indicator 229A, and the language button 212 includes an overview state indicator 229B. The check-boxes, 229A and 229B, indicate whether at least one of their respective data items are in a checked/selected state. Because at least one data item within the territories detail window 222 has been "checked", the territories overview check-box 229A displays a checked status.

The territories detail window 222 also provides users with a pop-up window 210A, a "more" detail button 210B, and a window close button 223. The pop-up window 210A may appear in response to an event, such as a right mouse button click that occurs proximate to a data item. The pop-up window 210A contains a context menu of operations. A context menu is a list of operations that perform an action on selected data item(s) and that are defined by the context of the selected data item(s) appearing within the detail window. The menu provides the user with an easy to use alternative to memorizing program commands and their appropriate usage. Some menu choices may lead to a second menu or a dialog box containing further commands. The items appearing on a menu can be selected with a keyboard, a mouse or another such interface device. In some situations when a menu item is not available to a user, the menu item is "grayed." When a menu item is "grayed" it is dimmed in comparison to valid menu choices. For example, if there were no data items 226 in the second control 224, the "Rename" and "Delete" context menu items would be grayed.

The pop-up window 210A allows the user to perform such operations as adding, deleting, and renaming data items 226. By right-clicking proximate to a data item, the pop-up window 210A appears. The add, delete, and rename operations of the pop-up window 210A allow the user to add, delete, and rename, respectively, a selected data item. Specifically, the add operation allows the user to add a new data item to the territories detail window 222. The delete operation allows the user to delete an existing data item from the territories detail window 222, and the rename operation allows the user to change the name of a data item contained within the territories detail window 222.

FIG. 3 depicts exemplary events involving the first and second controls of the present invention. With reference to FIG. 3, "component" column 230 lists the element that is involved in an event. The "Event" column 232 lists the type of action associated with the corresponding component for each row. The "Generated by" column 234 lists the source of the triggering event that elicits the response described in the "Description of Response" column 236.

For example, reference numeral 238 identifies the first event row. The first event row 238 indicates that if a check-list button control is clicked by the user, then a detail window is opened. In another example, row 240 shows that if the component list box is right mouse button clicked by the user the appropriate context menu is activated in response.

Figure 4:
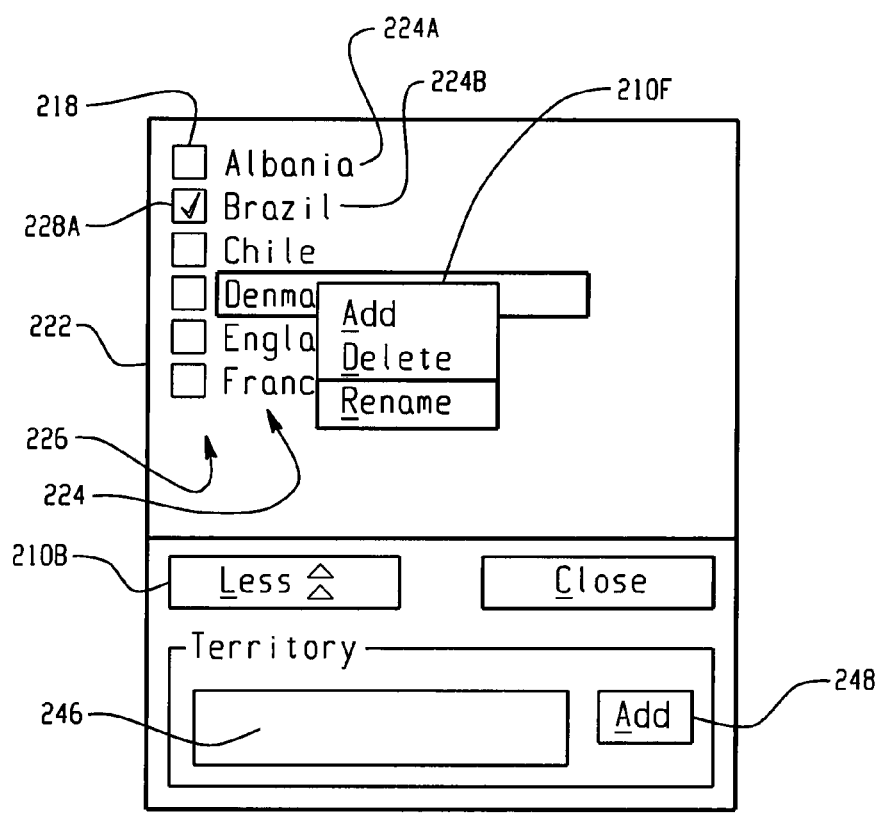
FIG. 4 is a graphical user interface that depicts the display of additional operations for manipulating data items.

FIG. 4 depicts the detail window 222 of the second control 224 after the "more" button has activated (note that the "more" button was displayed at reference numeral 210B on FIG. 2). The activation of the "more" button expands the viewing area of the territories detail window 222 and provides, among other things, an input field 246 as another way for the user to enter user generated data items. The user may type a new territories data item into the input field 246. Then, by clicking on the add button 248, the new territories data item is stored and displayed with the detail window 222 as one of the territories data items of the second control 224.

Figure 5:
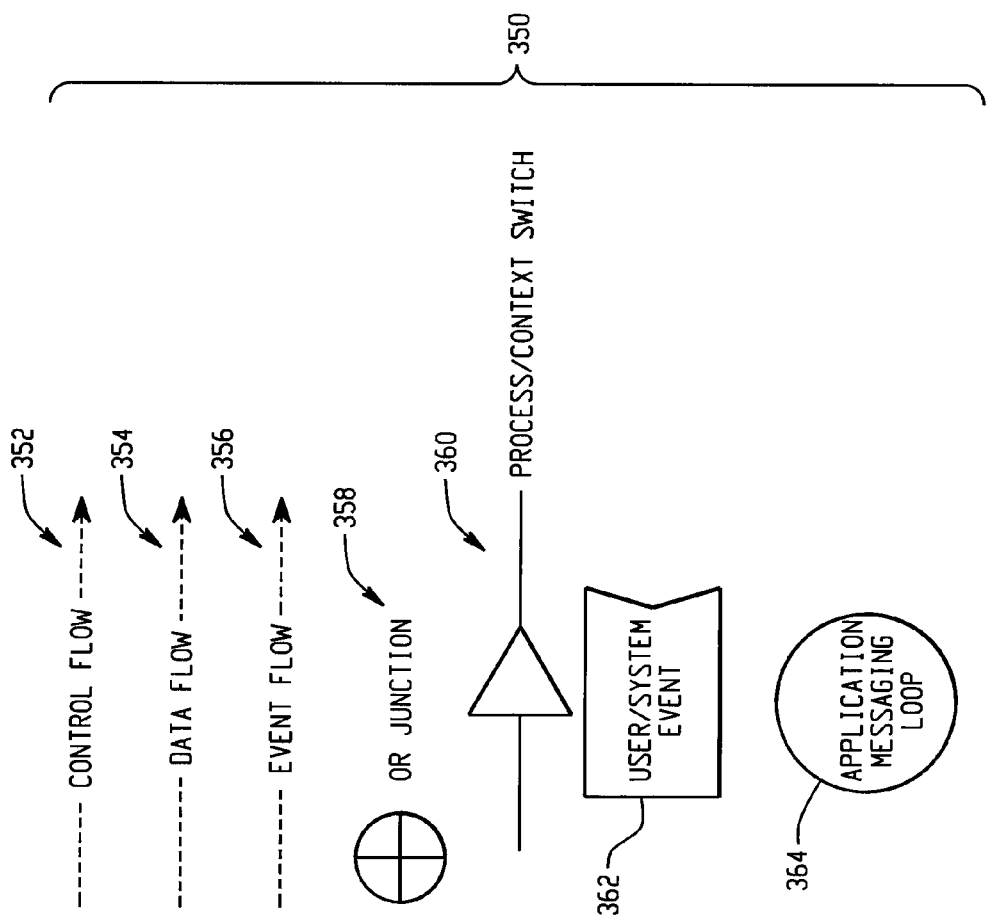
FIG. 5 is a legend used in describing the flowcharts of FIGS. 6-24.

FIG. 5 depicts a legend 350 for use in describing the flowcharts of FIGS. 6-24. The legend 350 depicts a control flow 352, a data flow 354, and an event flow 356. A control flow 352 signifies when processing transitions from one process block to another. A data flow 354 signifies when data is transferred from one process block to another. An event flow 356 signifies the occurrence of an externally generated event.

Other symbols include an OR junction symbol 358 for indicating that a process branch is selected from several available ones. Also shown is a Process/Context switch 360, which denotes the transfer of control from one event-handling program to another. For example, the Process/Context switch 360 can denote the transfer of control from the event handler of the first control to the event handler of the check-list detail window (CLDW). A User/System Event symbol 362 denotes the source of an externally generated event. An Application Messaging Loop 364 signifies the looping back of the present invention to check for the occurrence of events and messages.

In handling the operations of the present invention, there are at least three event-handling sections:
1) the main messaging loop of the application;
2) the event handler for the operation control;
3) the event handler for the detail window.

A process overview of the present invention is as follows. After activation of the first control, the graphical user interface constructs the second control and populates it with data items. The graphical user interface allows the user to manipulate the second control, and then recovers the updated data items list upon completion. As the user manipulates the second control, various events are triggered, which are routed (via the operating system and controlling software application) to the event handler of the second control push-button or the check-list detail window. Optionally, the developer can prevent the user from editing the items in the check-list detail window. In which case, such operations as the "more" button and the modify pop-up context menu become unavailable to the user.

Figure 6A:
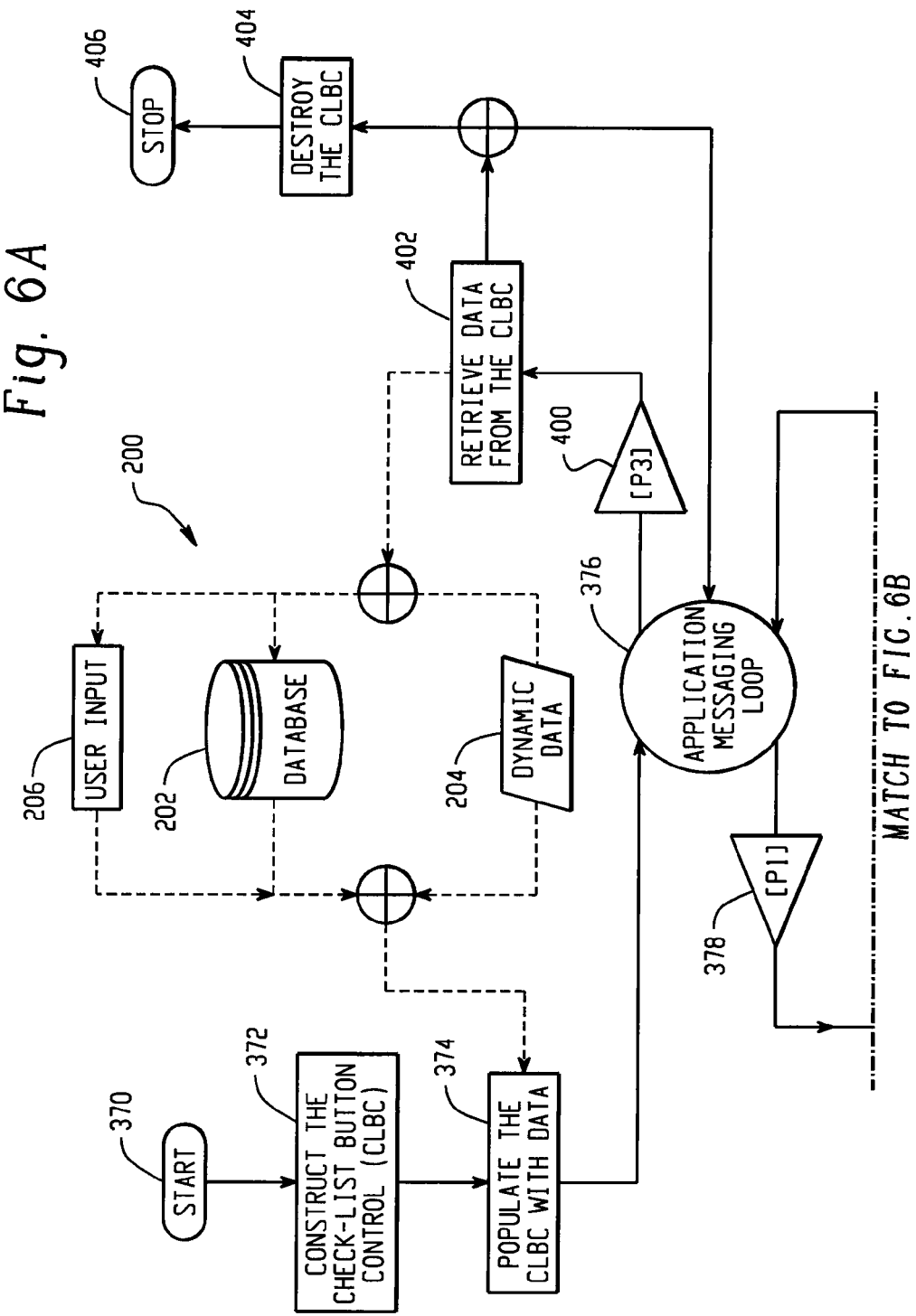
FIGS. 6A and 6B are a system overview flowchart depicting the steps used by the present invention to generate and handle data through the check-list button control.
Figure 6B:
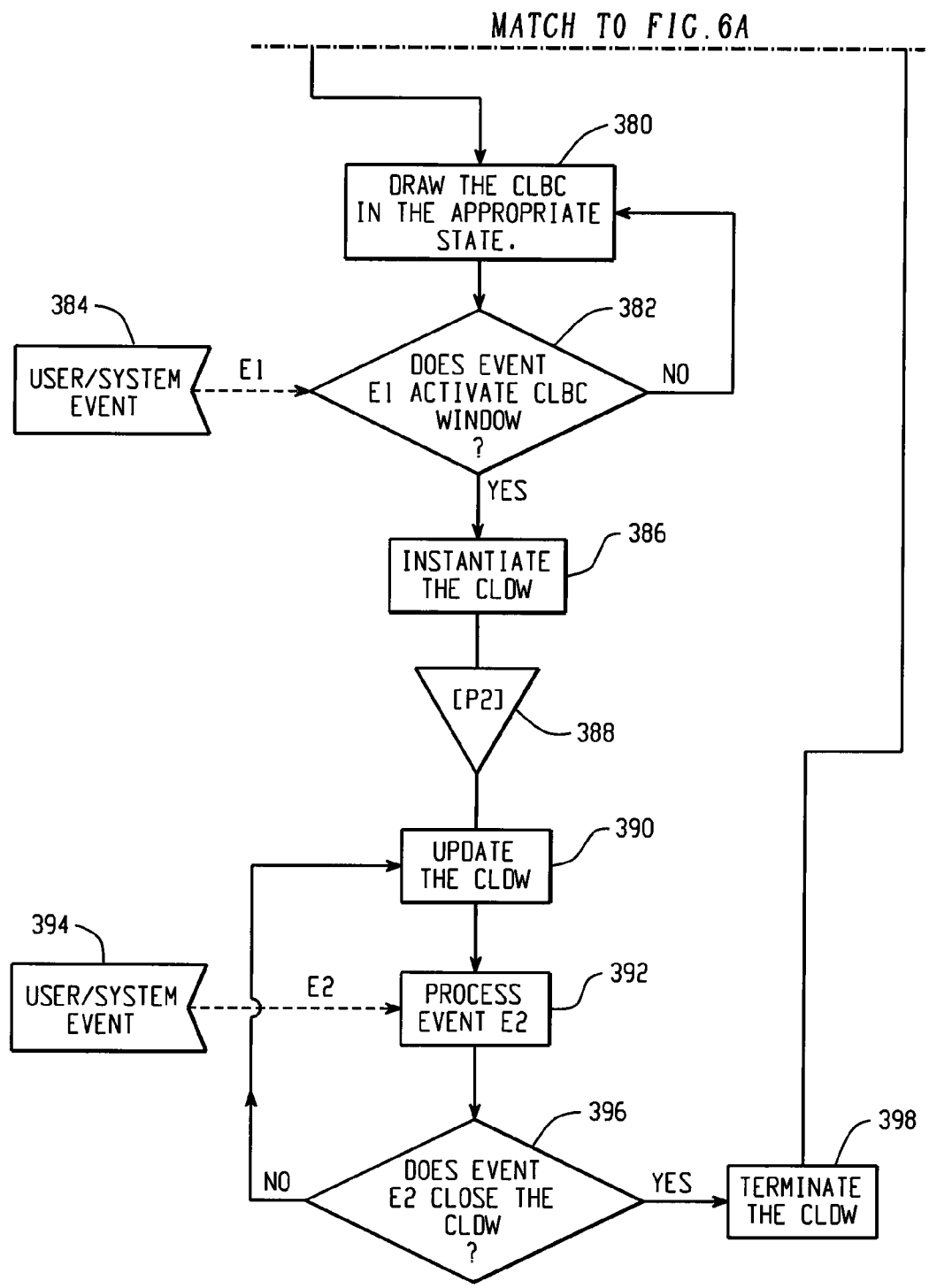

This processing performed by the present invention is shown more specifically by the flowchart of FIGS. 6A and 6B. With reference to FIGS. 6A and 6B, start block 370 indicates that processing starts at process block 372. At process block 372, the second control is constructed. Process block 374 populates the second control with data items. The source of the data items for process block 374 may be from a variety of sources, such as the sources shown by reference numeral 200. For example, the data sources 200 may include populating the second control with data items from the database 202, dynamic data 204, and/or user input 206. After population of the second control has completed, processing continues at the application messaging loop 376.

The application messaging loop 376 is in a wait mode until a process/context switch 378 occurs. The process/context switch 378 may occur for example if the user resizes, moves, or maximizes the graphical user interface 102 containing the first control 104, causing the window to be redrawn. Accordingly, if process/context P1 switch 378 occurs, then processing continues at process block 380. Process block 380 draws the second control in the appropriate state in the check-list detail window. The appropriate state is determined by the data that was retrieved from the data sources 200. Decision block 382 examines whether a first event ("E1") has activated the check-list box detail window. A first event typically includes the user clicking a mouse button in the graphical user interface 102. If the user/system 384 has not activated the check-list detail window so as to constitute the first event, then processing returns to process block 380. However, if a first event has activated the check-list detail window, then processing continues at process block 386. Process block 386 instantiates the check-list detail window.

If a process/context P2 switch 388 occurs, process block 390 updates the checklist detail window with the current information for each data item 108, item selection status, and window status. Process block 392 is activated when a second event is sent from the user/system 394. When process block 392 receives the second event, processing continues at decision block 396. Examples of the second event may include the user selecting the more detail button on the check-list detail window in order to expand the check-list detail window (note that other examples are described below in the flowcharts of FIGS. 10-22).

Decision block 396 examines whether the second event indicates that the checklist detail window should be closed. If it is not to be closed, then processing continues at process block 390 wherein the check-list detail window is updated. However, if the second event indicates that the check-list detail window should be closed, then process block 398 terminates the check-list detail window before processing returns to the application messaging loop 376.

The application messaging loop 376 handles a third process/context switch 400 such that when it occurs, process block 402 is executed. Process block 402 retrieves data from the second control, such as when a user has provided one or more additional data items in the second control. The retrieved data items are then used to populate either the database 202 or the dynamic data 204 depending upon which source has been selected (either by the software application or the user) to receive the data. After process block 402 has executed, processing returns to the application messaging loop 376. Additionally, process block 404 will be executed to destroy the second control when it is no longer needed, for example, as when the user closes the graphical user interface 102 or shuts down the software application 117. Processing terminates at stop block 406.

Figure 7:
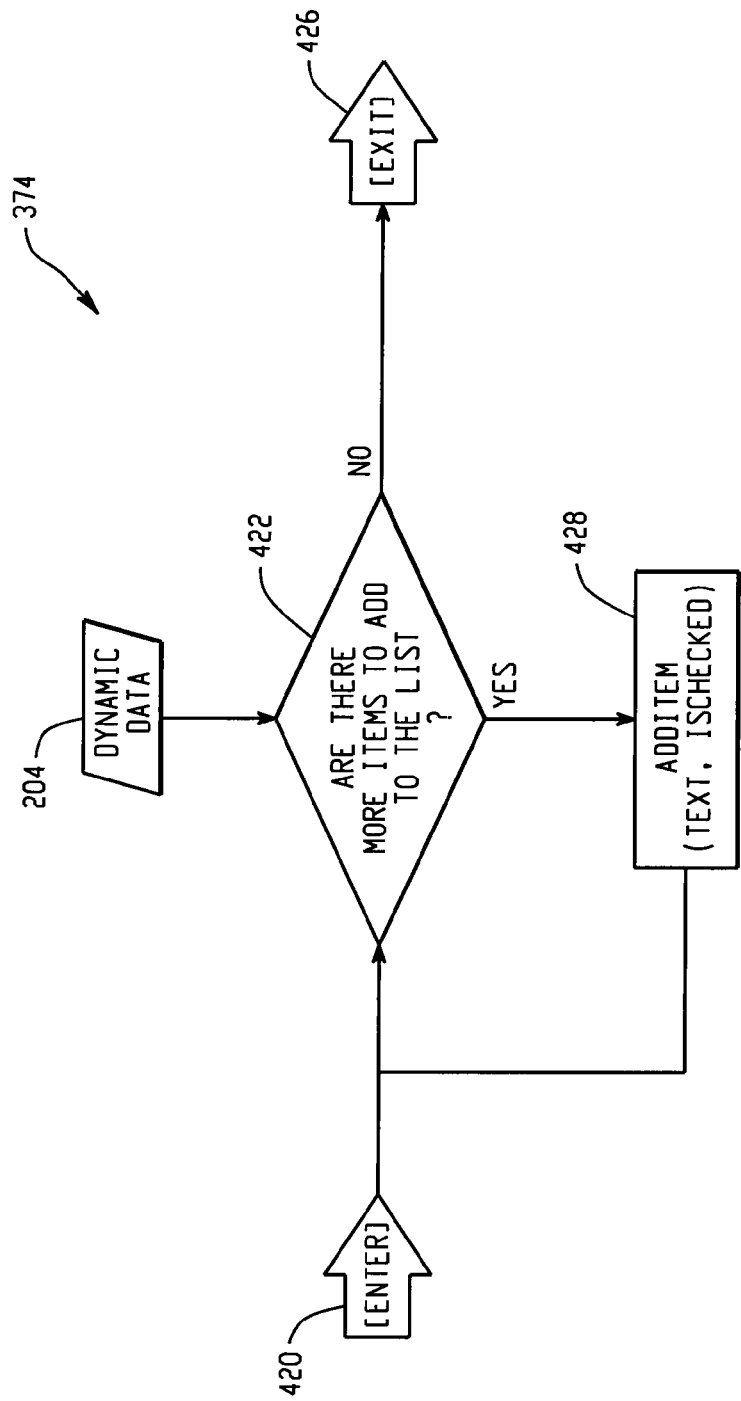
FIGS. 7 and 8 are flowcharts depicting population of the check-list box control with data from different sources.
Figure 8:
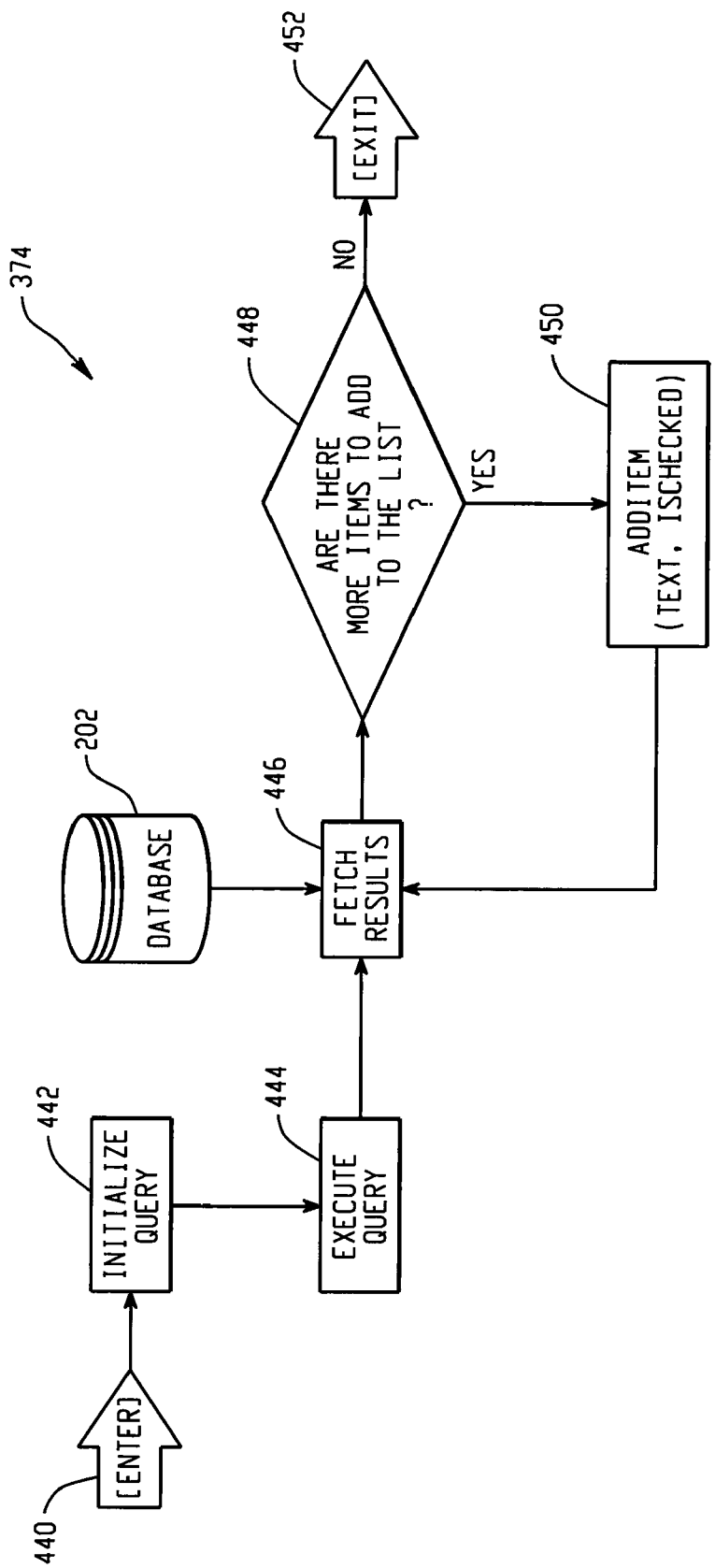

FIGS. 7 and 8 depict two exemplary methods for populating the second control. FIG. 7 depicts steps that directly supply each of the data items and their selection states to the second control by repeatedly calling the "AddItem( )" method. The "AddItem( )" method is a method from the programming language of C++. With reference to FIG. 7, the enter arrow 420 indicates that decision block 422 is processed first. Decision block 422 examines whether there are more data items to be added to the second control from the dynamic data source 204. If there are no more data items, then processing returns to the main processing loop as indicated by exit arrow 426. However, if there are more data items to be added to the second control, then process block 428 adds the data items through the "AddItem( )" method. In this example, the "AddItem( )" method contains two arguments wherein the first argument contains the text of the item to be added, and the second argument indicates the state of the data item (such as whether it is in a checked or unchecked state). Processing continues at decision block 422 before processing can exit at exit arrow 426.

FIG. 8 depicts exemplary steps to add data items from a database 202 to the second control. With reference to FIG. 8, enter arrow 440 indicates that process block 442 executes. At process block 442, the database query is initialized by the software application 117. Process block 444 executes the query, and the results are fetched from the database 202 by process block 446. If there are more data items to be added to the second control as determined by decision block 448, then process block 450 adds the data items one at a time as they are fetched during execution of process block 446. If no more data items are to be added to the second control, then processing returns to the main processing loop as indicated by exit arrow 452.

The population of the second control through the database 202 provides for the situation when the second control is used in applications that are connected to the database 202. In this situation, the second control communicates directly with the database 202. Such an approach of the present invention makes the overall application more efficient because the retrieving of the data items from the database 202 is deferred until the user actually activates the first control to display the check-list display window. In the situations where the user does not activate the first control, only minimal communications occur, such as when the state of the selection indicator needs to be determined. Similarly, if the second control is connected directly to the database 202, then the second control writes only new or modified data back to the database 202, thereby further reducing costly communications with the database 202.

Figure 9A:
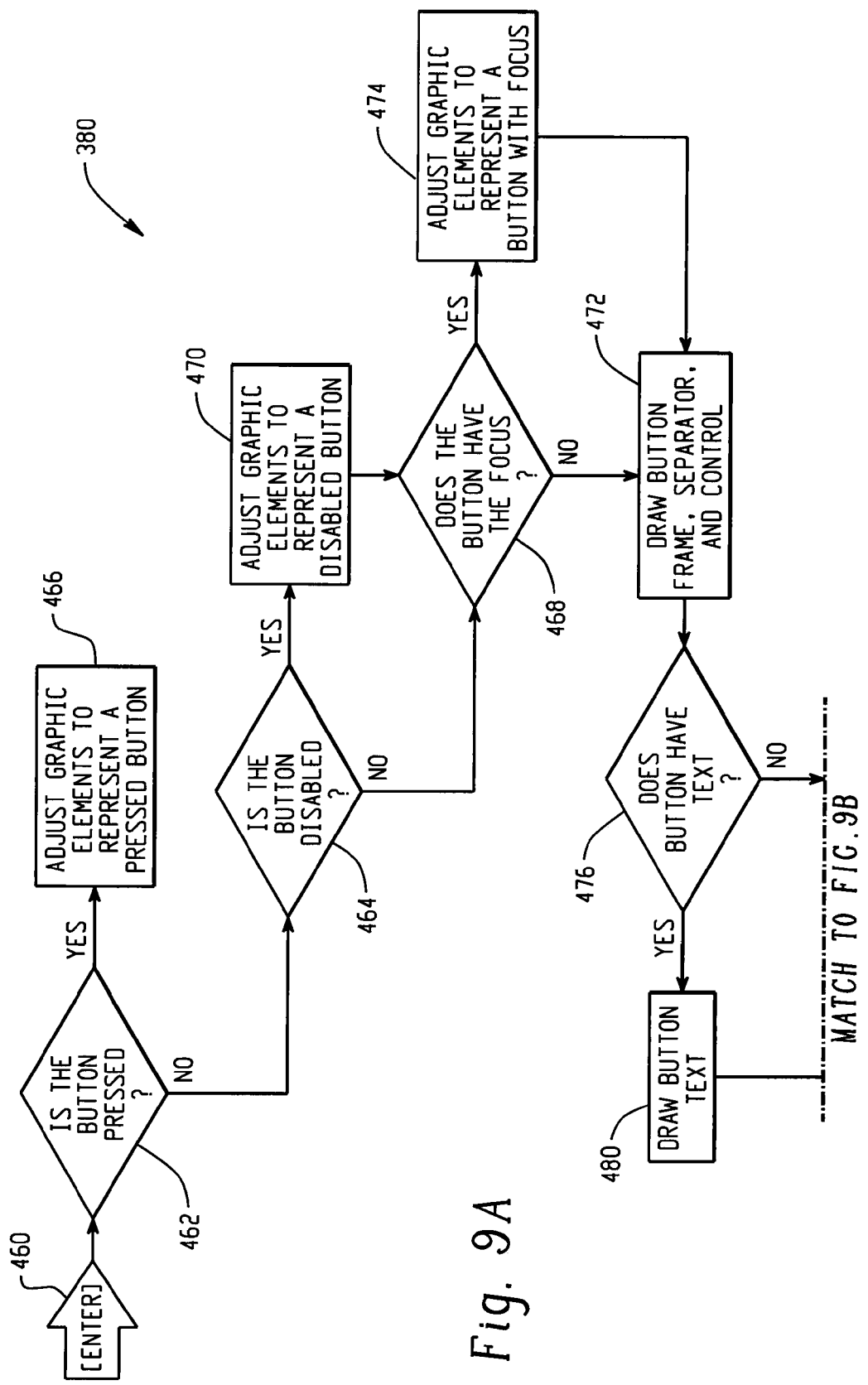
FIGS. 9A and 9B are a flowchart depicting the steps used by the present invention to draw the check-list control button.
Figure 9B:
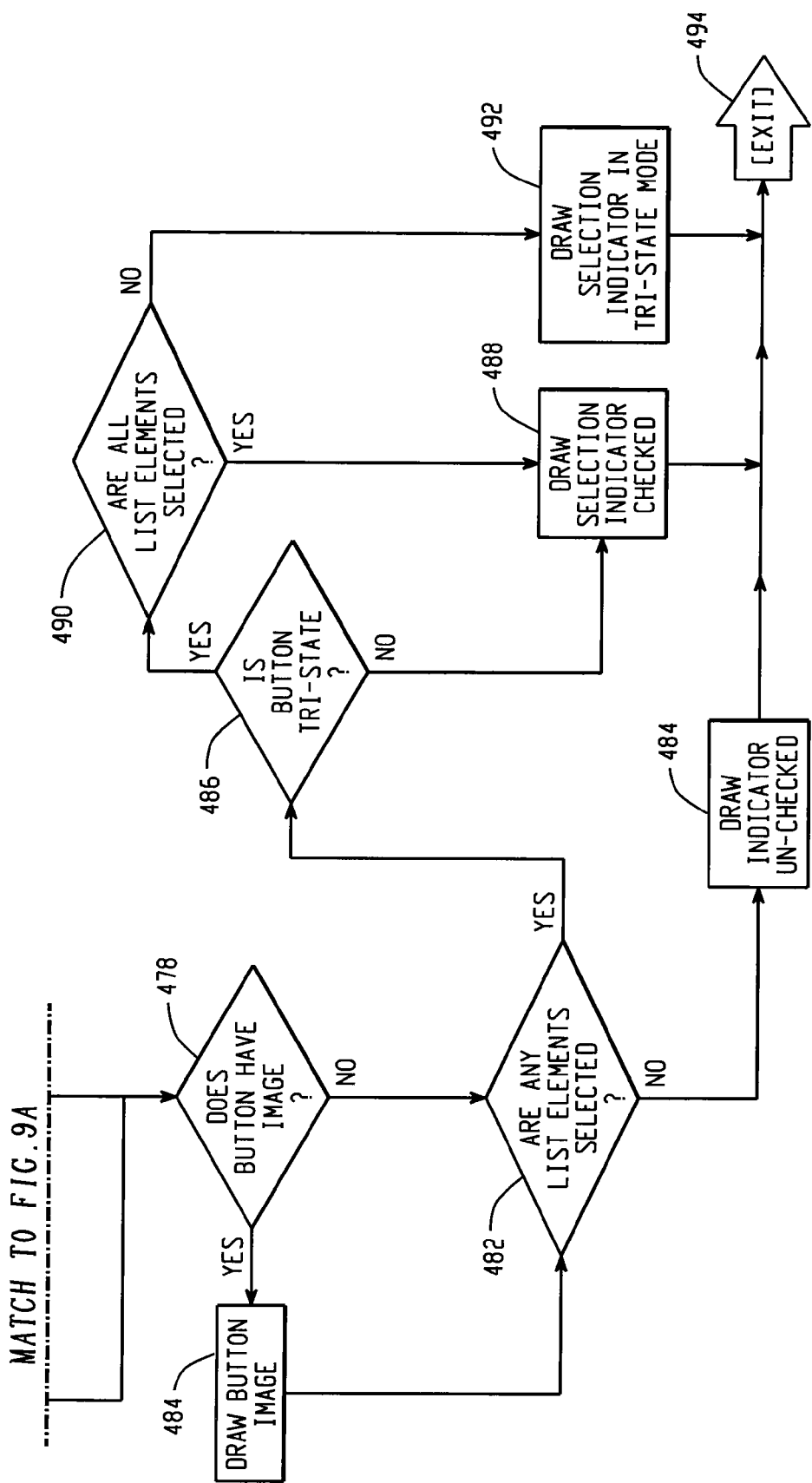

FIGS. 9A and 9B depict exemplary steps in the visual drawing of the second control in the checklist detail window. With reference to FIGS. 9A and 9B, enter arrow 460 indicates that decision block 462 examines whether one of the operations' buttons to activate the second control has been pressed. This may include, for example, when the user clicks a mouse button or presses an associated key sequence. If the button has not been pressed, then processing continues at decision block 464. However, if the button has been pressed as determined by decision block 462, then processing continues at process block 466. Process block 466 adjusts a graphic element to represent a pressed button. Processing continues at decision block 464 that examines whether the activation button has been disabled. If the activation button has not been disabled, then processing continues at decision block 468. However, if the activation button has been disabled as determined by decision block 464, then process block 470 adjusts the graphic element to represent a disabled button. Processing continues at decision block 468.

Decision block 468 examines whether the activated button has the focus. If the button does not have the focus, then processing continues at process block 472. However, if the button does have the focus, then process block 474 adjusts the graphic elements to represent a button with the focus. Processing continues at process block 472. At process block 472, the button frame, separator, and control are drawn.

Decision block 476 next examines whether the button contains text. If it does not contain text, then processing continues at decision block 478. However, if the button does have text as determined by decision block 476, then process block 480 draws the button text before processing continues at decision block 478. Decision block 478 examines whether the button has an image. If it does not have an image, then processing continues at decision block 482. However, if the button does have an image, then process block 484 draws the button image before processing continues at decision block 482.

Decision block 482 examines whether there are any data items that have been selected by the user. If no data items have been selected, then process block 484 draws the overview indicator as "un-checked" before processing exits this routine at exit arrow 494. However, if there are data items that have been selected as determined by decision block 482, then decision block 486 examines whether the button is a tri-state button. If it is not, then process block 488 draws the selection indicator as "checked" before exiting the routine at exit arrow 494. However, if the button is a tri-state button, then decision block 490 examines whether all data items have been selected. If all data items have been selected, then processing continues at process block 488 so that the selection indicator that has been checked may be drawn. However, if not all data items have been selected as determined by decision block 490, then processing continues at process block 492. Process block 492 draws the selection indicator in a tri-state mode. For example, the first control can be put in the "tri-state" mode, in which the selection indicator can be used to further distinguish between some data items selected and all data items selected. After process block 492 has finished executing, the routine exits as shown by exit arrow 494.

Figure 10:
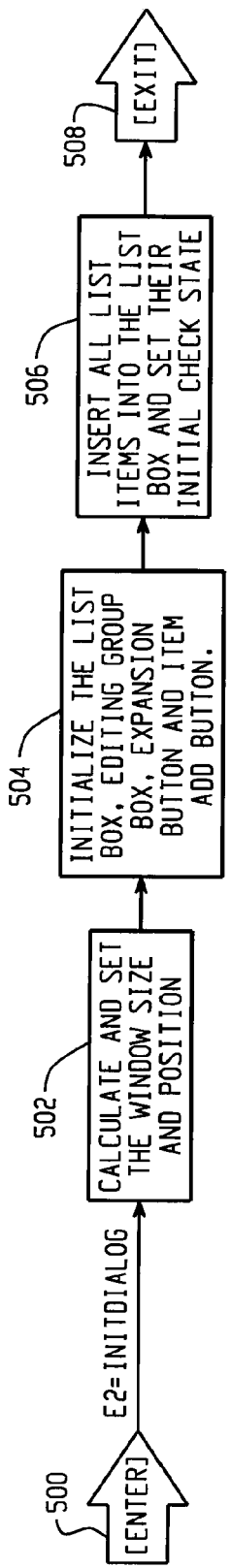

FIGS. 10-22 depict various events that are handled by the present invention. FIG. 10 depicts steps performed by the present invention to handle the event that initializes the checklist detail window. With reference to FIG. 10, enter arrow 500 indicates that for an initialize dialogue event, process block 502 is first performed. Process block 502 calculates and sets the window size and position of the check-list detail window. Process block 504 initializes the second control, the editing group box, the expansion (more) button, and the add data items button. Process block 506 inserts all data items into the second control and sets their initial individual check state values as expressed in the check boxes. Processing returns to the main routine as indicated by exit arrow 508.

Figure 11:
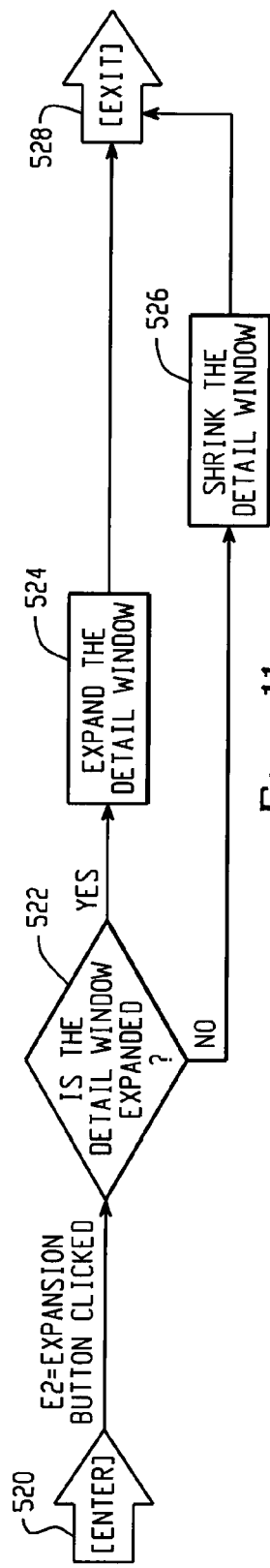

FIG. 11 depicts the steps used by the present invention to handle a "more" button click event. With reference to FIG. 11, enter arrow 520 indicates that for a "more" button click event, decision block 522 is first executed. Decision block 522 examines whether the check-list detail window of the check-list detail window has been expanded. If it has, then process block 524 expands the check-list detail window before processing returns to the main routine as indicated by the exit arrow 528. However, if decision block 522 determines that the check-list detail window has not been expanded, then process block 526 shrinks the check-list detail window before processing returns as indicated by exit arrow 528.

Figure 12:
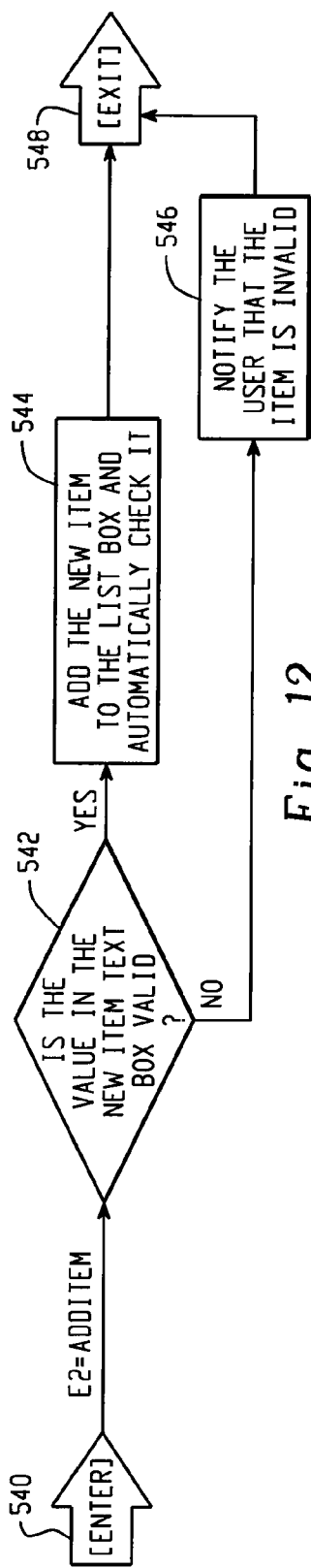

FIG. 12 depicts the steps used by the present invention to add a new data item to the second control. With reference to FIG. 12, enter arrow 540 indicates that for an add item event, decision block 542 is first performed. Decision block 542 examines whether the value of the new item text box is valid. If it is valid, then process block 544 adds the new item to the second control and automatically places a check mark in the corresponding check box to indicate that it is selected. Processing continues at the main routine as indicated by the exit arrow 548. However, if decision block 542 determines that the value is not valid, then process block 546 notifies the user that the item is invalid before returning processing to the main routine as indicated by exit arrow 548. An example of when a value may not be valid is a data item is a numeric type and the user enters text.

Figure 13:
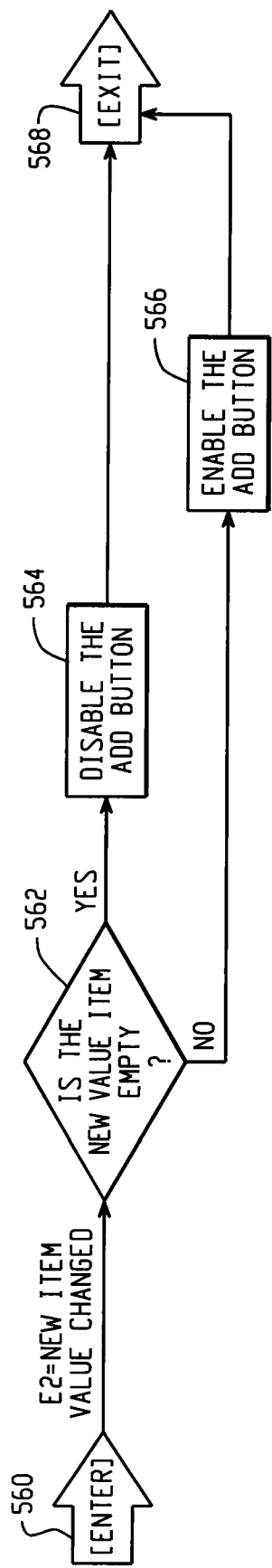

FIG. 13 depicts the steps used by the present invention to handle a new item value change event. With reference to FIG. 13, enter arrow 560 indicates that for a new item value change event, decision block 562 is performed. Decision block 562 examines whether the new item value is empty. If it is, then process block 564 disables the add button before processing returns to the main routine as indicated by exit arrow 568. However, if the new item value is not empty as determined by decision block 562, then process block 566 enables the add button before processing returns as indicated by exit arrow 568.

FIG. 14 depicts the steps used by the present invention to handle a right mouse button click in the check-list display window event. With reference to FIG. 14, enter arrow 580 indicates that for a right mouse button click in the check-list display window event, process block 582 is performed. Process block 582 displays the modify entry context menu wherein the context menu displays operations and sub-operations that may be performed upon data items in the check-list display window. Processing returns to the main routine as indicated by the exit arrow 584.

FIG. 15 depicts the steps used by the present invention to handle a draw item event. With reference to FIG. 15, enter arrow 590 indicates that for a draw item event, decision block 592 is performed. Decision block 592 examines whether the item to be drawn is a more button. If it is not, then process block 594 defers to the default drawing procedure in order to render the other controls (e.g. 223, 246, 248) contained by the check-list detail window 222. Processing then returns to the main routine as indicated by exit arrow 602.

However, if decision block 592 determines that the item to be drawn is a "more" button, then decision block 596 examines whether the check-list detail window is to be expanded. If it is to be expanded, then process block 598 draws the more button as the less button before processing returns to the main routine as indicated by exit arrow 602. However, if the check-list detail window is not to be expanded as determined by decision block 596, then process block 600 draws the more button before processing returns as indicated by exit arrow 602.

FIG. 16 depicts the steps used by the present invention to handle a close check-list detail window event. With reference to FIG. 16, enter arrow 610 indicates that for a close checklist detail window event, process block 612 is performed. Process block 612 updates the data items of the second control, and process block 614 closes the check-list detail window. Processing returns to the main routine as indicated by exit arrow 616.

Figure 17:
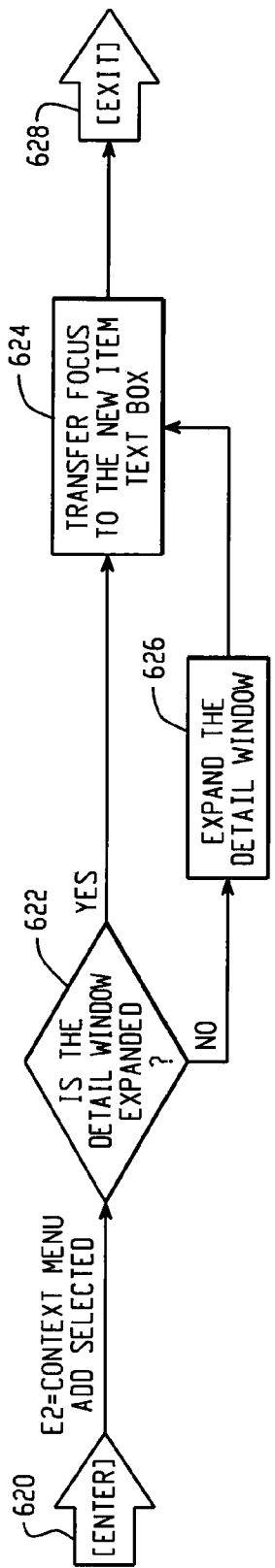

FIG. 17 depicts the steps used by the present invention to handle a modify pop-up context menu add selection event. With reference to FIG. 17, enter arrow 620 indicates that for the context menu add selection event that decision block 622 is performed. Decision block 622 examines whether the check-list detail window has been expanded. If it has, then process block 624 transfers the focus to the new item text box before processing returns to the main routine as indicated by exit arrow 628. However, if decision block 622 determines that the check-list detail window has not been expanded, process block 626 expands the check-list detail window before processing continues at process block 624.

Figure 18:
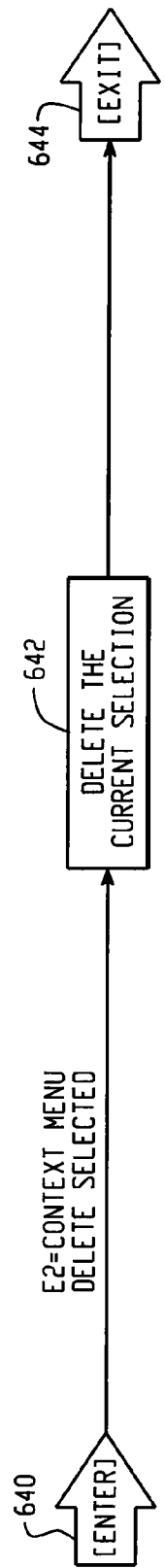

FIG. 18 depicts the steps used by the present invention to handle a modify pop-up context menu delete selection event. With reference to FIG. 18, enter arrow 640 indicates that for a context menu delete selection event, process block 642 deletes the current selection. Processing returns to the main routine as indicated by exit arrow 644.

Figure 19:
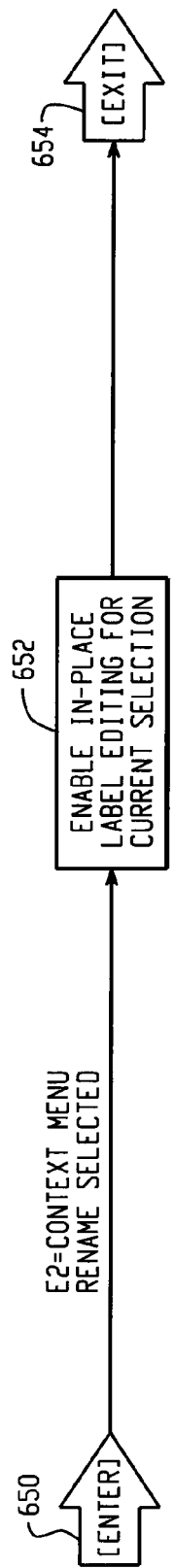

FIG. 19 depicts the steps used by the present invention to handle a modify pop-up context menu rename selection event. With reference to FIG. 19, enter arrow 650 indicates that for a context menu rename selection event, process block 652 enables an in-place label editing for the current selection. Processing returns to the main routine as indicated by the exit arrow 654.

Figure 20:
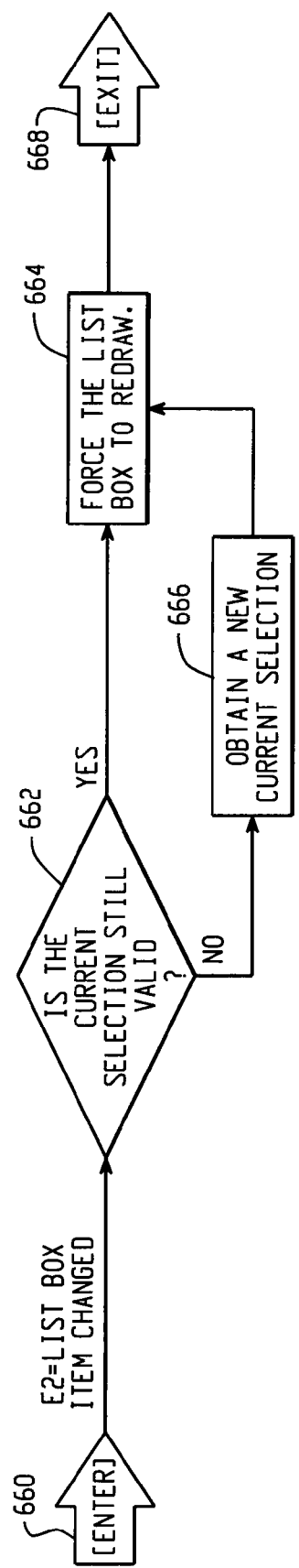

FIG. 20 depicts the steps used by the present invention to handle a check-list detail window data item change event. With reference to FIG. 20, enter arrow 660 indicates that for a check-list display window data item change event, decision block 662 is performed. Decision block 662 examines whether the current election is valid. A current selection is valid, for example, if it contains one or more non-blank characters. If the current selection is valid, then process block 664 forces the check-list display window to be redrawn before processing returns to the main routine as indicated by the exit arrow 668. However, if the current selection is still not valid as determined by decision block 662, then process block 666 obtains a new current selection before processing continues at process block 664, that is, the second control is refreshed.

Figure 21:
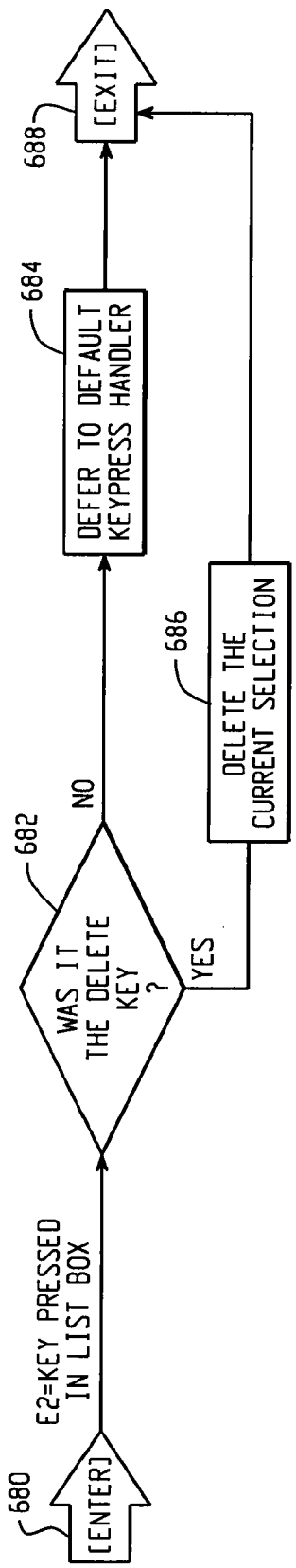

FIG. 21 depicts the steps used by the present invention to handle a key pressed event that occurs in the check-list detail window. With reference to FIG. 21, enter arrow 680 indicates that for a key pressed in the check-list detail window event, decision block 682 is performed. Decision block 682 examines whether the pressed key was a delete key. If it is not, then process block 684 defers processing to the default key press handler before processing continues at the main routine as indicated by the exit arrow 688. The default key press handler is used to process common events without requiring explicit processing by the software application 117. For example, common events include using the up arrow and down arrow keys to change the currently selected data item. However, if the delete key was pressed as determined by decision block 682, then process block 686 deletes the current selection before processing returns to the main routine.

Figure 22:
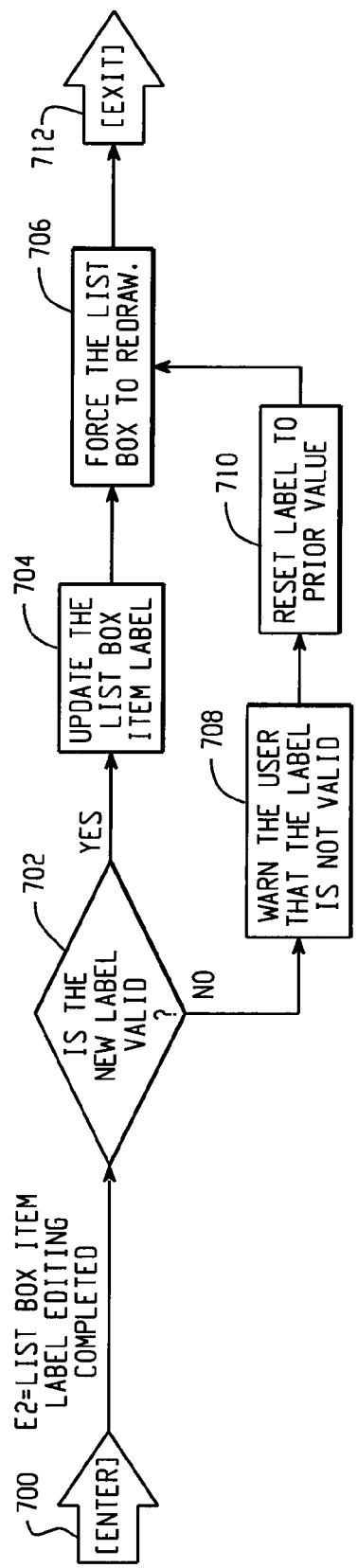

FIG. 22 depicts the steps used by the present invention to handle a data item label editing completed event. With reference to FIG. 22, enter arrow 700 indicates that for such an event, decision block 702 is performed. Decision block 702 examines whether the new label that was just edited is valid. If it is, then process block 704 updates the data item label. Process block 706 forces the check-list detail window to be redrawn before processing continues at the main routine as indicated by the exit arrow 712. However, if decision block 702 determines that the new label is not valid, then process block 708 warns the user that the label is not valid. Process block 710 then resets the label to its prior value before continuing the process at process block 706.

Figure 23:
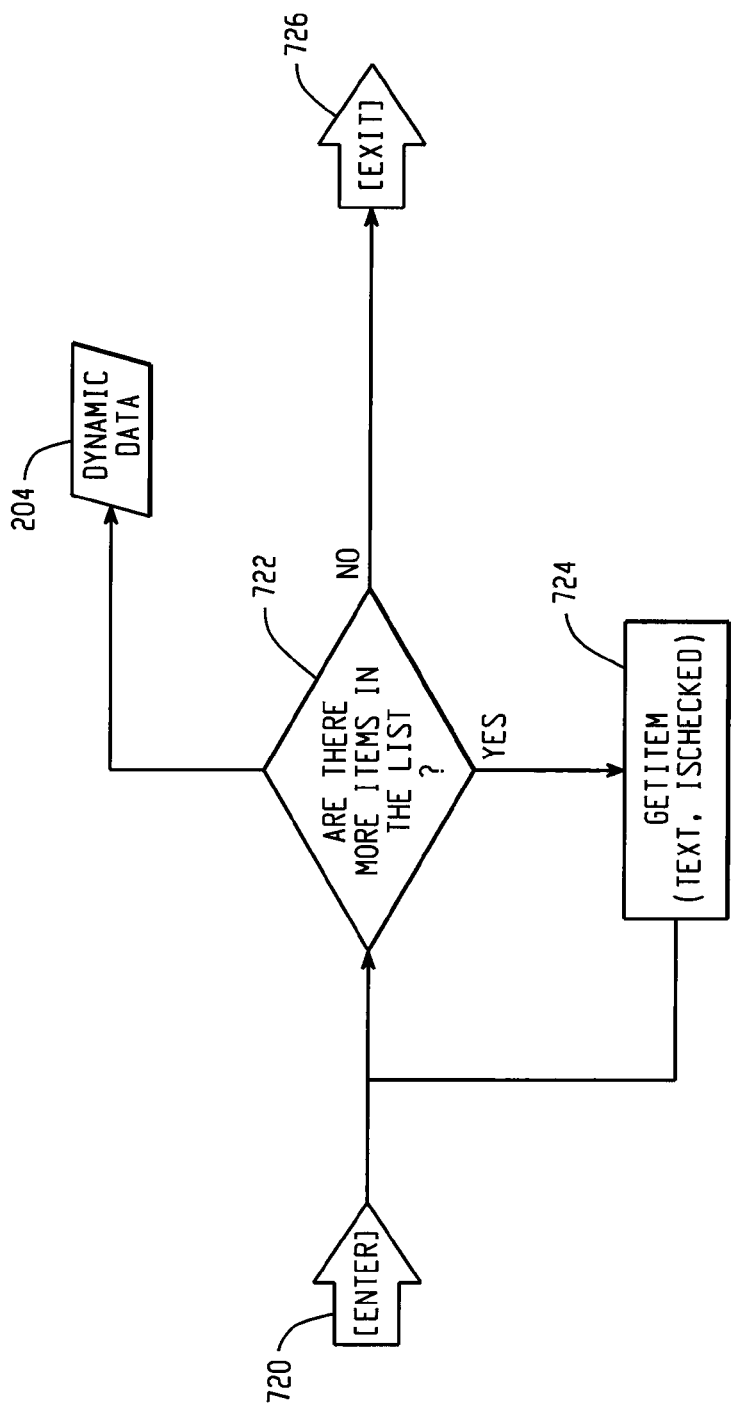
FIGS. 23 and 24 are flowcharts depicting the steps used by the present invention to retrieve data from the check-list box control for storage in different data storage mechanisms.
Figure 24:
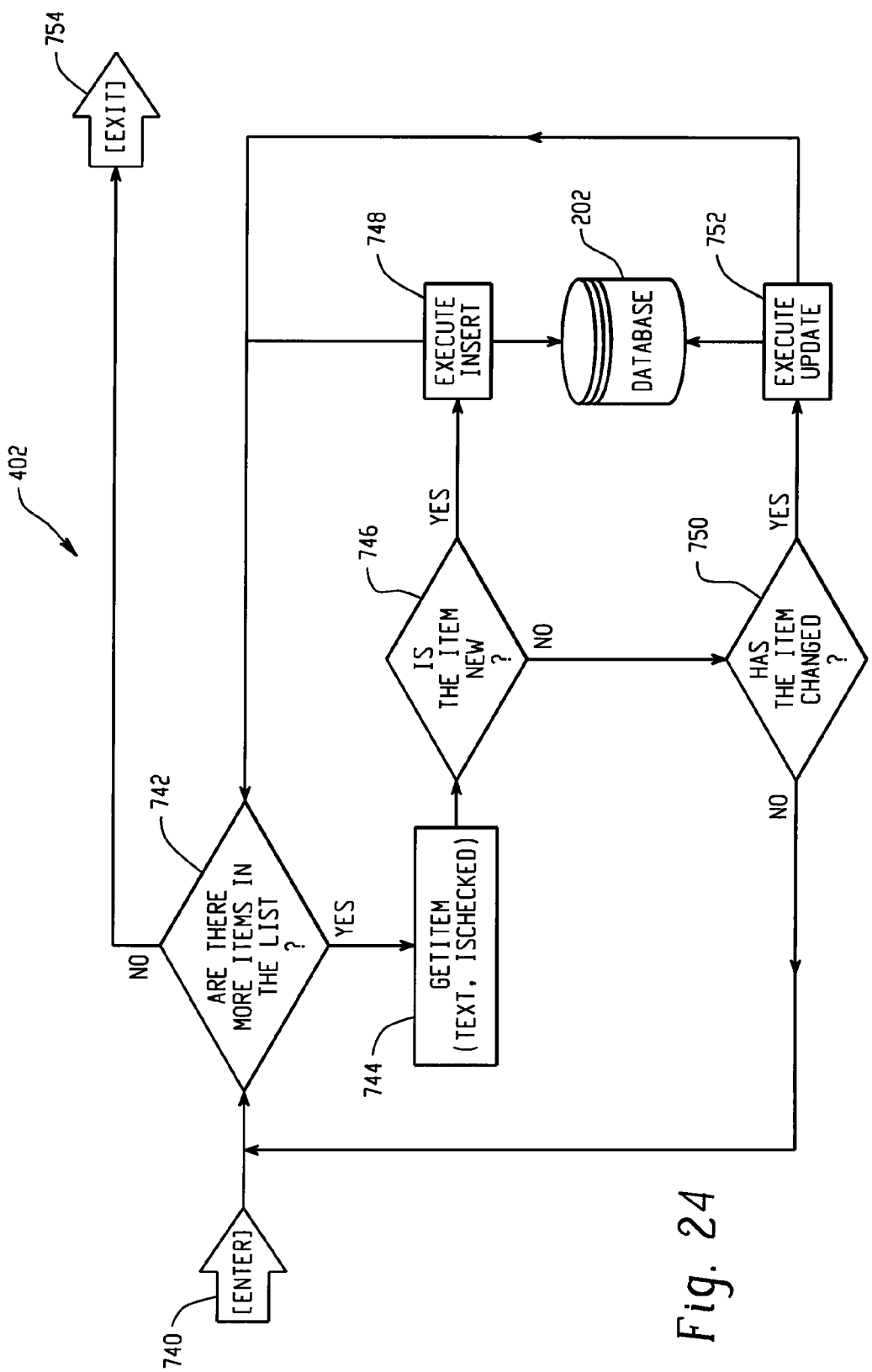

FIGS. 23 and 24 depict steps used to retrieve the data items from the second control for storing of the data items in a permanent location. FIG. 23 depicts the steps used to store the data items in the dynamic data location 204. With reference to FIG. 23, enter arrow 720 indicates that decision block 722 is performed. Decision block 722 examines whether there are more data items in the check-list detail window that are to be stored in the dynamic data location 204. If there are more items to be stored, then the "GetItem( )" method is used by process block 724 to obtain each of the data items in the check-list display window so that they can be stored in the dynamic data location 204. After the items in the check-list detail window have been obtained and stored in the dynamic data location 204, processing returns to the main routine as indicated by exit arrow 726.

FIG. 24 depicts the present invention storing data items in the database 202. With reference to FIG. 24, enter arrow 740 indicates that decision block 742 is to be performed. Decision block 742 examines whether there are any more data items in the check-list display window that need to be retrieved and stored. If there are, then process block 744 uses the GetItem( ) method to retrieve each of the data items in the check-list display window. Decision block 746 examines whether each the data items has been newly inserted by the user. If it has, then process block 748 executes a database insert command to insert the new data item into the database 202 before processing returns to decision block 742. However, if the data item in the check-list detail window is not new as determined by decision block 746, then decision block 750 is performed.

Decision block 750 examines whether each of the data items in the check-list detail window has changed. If it has, then process block 752 executes a database update command in order to update the data item in the database 202. If the data item has not changed as determined by decision block 750, then processing returns to decision block 742. If there are no more data items in the check-list detail window, then processing returns to the main routine as indicated by exit arrow 754.

As shown by the above description and figures, the second control of the present invention allows, among other things, for the user to individually select (or deselect) multiple items from the second control in the check-list detail window, and to modify the second control in the check-list detail window by adding, deleting or renaming the items. The present invention achieves this in an ergonomic manner that uses a reduced amount of screen space than when the second control is in active use. It also provides feedback to the user about the data items selection status. Moreover, it will be appreciated that the above description relates to the preferred embodiments by way of example only. Many variations on the invention will be obvious to those knowledgeable in the field, and such variations are within the scope of the invention as described and claimed.

It is claimed:

1. A computer-implemented method of selecting data records, comprising:
   querying, using one or more processors, a database to access a plurality of data records;
   providing, using the one or more processors, a graphical interface for selecting one or more of the accessed data records, wherein each of the plurality of data records is selectable;
   providing, using the one or more processors, a button within a window of the graphical interface, wherein the button is a pull-down control button that includes an overview indicator that displays an unselected state when no data records are selected, and a selected state when at least one data record is selected;
   generating, using the one or more processors, a pull-down display within the window when a button selection is received, wherein the pull-down display includes a list of the plurality of data records and a selectable control for each data record;
   generating, using the one or more processors, a display of one or more database manipulation options based upon a command from the pull-down display, wherein a data record in the database is manipulated when an option is selected; and
   displaying, using the one or more processors, the overview indicator when the pull-down display is closed, wherein the overview indicator indicates whether any data records on the list are in the selected state.

2. The method claim 1, further comprising:
   storing the particular data record in a database.

3. The method of claim 1, wherein a pop-up window provides a menu of operations configured to perform actions on a selected data record appearing within the pull-down display.

4. The method of claim 1, wherein the pull-down display is configured to display data records from two or more data sources including a database, a record source, and a dynamic record generator.

5. The method of claim 1,
   wherein one of the database manipulation options is to add a new data record to the database.

6. The method of claim 1,
   wherein one of the database manipulation options is to delete a data record from the database.

7. The method of claim 1,
   wherein one of the database manipulation options is to rename a data record.

8. The method of claim 1, wherein an identification of whether a first data record is selected in the pull-down display is presented proximate to the first data record.

9. The method of claim 1,
   wherein the pull-down display is configured to receive a command to select multiple data records as a group.

10. The method of claim 1, wherein the pull-down display identification of whether each of the plurality of data records is selected includes separate checkbox interface items corresponding to each of the one or more data records, wherein multiple checkbox interface items are configured to be concurrently selected, and wherein data records selected through their associated checkbox interface items are used as data by a software application.

11. The method of claim 1, wherein the overview indicator includes a check-box, and wherein the button includes an icon.

12. A computer-implemented system for selecting data records, comprising:
   one or more processors;
   one or more computer-readable storage mediums containing software instructions executable on the one or more processors to cause the one or more processors to perform operations including:
   querying a database to access a plurality of data records;
   providing a graphical interface for selecting one or more of the accessed data records, wherein each of the plurality of data records is selectable;
   providing a button within a window of the graphical interface, wherein the button is a pull-down control button that includes an overview indicator that displays an unselected state when no data records are selected, and a selected state when at least one data record is selected;
   generating a pull-down display within the window when a button selection is received, wherein the pull-down display includes a list of the plurality of data records and a selectable control for each data record;
   generating a display of one or more database manipulation options based upon a command from the pull-down display, wherein a data record in the database is manipulated when an option is selected; and
   displaying the overview indicator when the pull-down display is closed, wherein the overview indicator indicates whether any data records on the list are in the selected state.

13. The system of claim 12, further comprising instructions executable on the one or more processors to cause the one or more processors to perform operations including:
   storing the particular data record in a database.

14. The system of claim 12, wherein a pop-up window provides a menu of operations configured to perform actions on a selected data record appearing within the pull-down display.

15. The system of claim 12, wherein the pull-down display is configured to display data records from two or more data sources including a database, a record source, and a dynamic record generator.

16. The system of claim 12, further comprising instructions executable on the one or more processors to cause the one or more processors to perform operations including:
add a new data record to the database.

17. The system of claim 12, further comprising instructions executable on the one or more processors to cause the one or more processors to perform operations including:
delete a data record from the database.

18. The system of claim 12, further comprising instructions executable on the one or more processors to cause the one or more processors to perform operations including:
rename a data record.

19. The system of claim 12, wherein an identification of whether a first data record is selected in the pull-down display is presented proximate to the first data record.

20. The system of claim 12, further comprising instructions executable on the one or more processors to cause the one or more processors to perform operations including:
receive a command to select multiple data records as a group.

21. The system of claim 12, wherein the pull-down display identification of whether each of the plurality of data records is selected includes separate checkbox interface items corresponding to each of the one or more data records, wherein multiple checkbox interface items are configured to be concurrently selected, and wherein data records selected through their associated checkbox interface items are used as data by a software application.

22. The system of claim 12, wherein the overview indicator includes a checkbox, and wherein the button includes an icon.

23. One or more computer-readable storage mediums encoded with instructions that when executed, cause one or more computers to perform a method of selecting data records, the method comprising:
querying a database to access a plurality of data records;
providing a graphical interface for selecting one or more of the accessed data records, wherein each of the plurality of data records is selectable;
providing a button within a window of the graphical interface, wherein the button is a pull-down control button that includes an overview indicator that displays an unselected state when no data records are selected, and a selected state when at least one data record is selected;
generating a pull-down display within the window when a button selection is received, wherein the pull-down display includes a list of the plurality of data records and a selectable control for each data record;
generating a display of one or more database manipulation options based upon a command from the pull-down display, wherein a data record in the database is manipulated when an option is selected; and
displaying the overview indicator when the pull-down display is closed, wherein the overview indicator indicates whether any data records on the list are in the selected state.

24. The one or more computer-readable storage mediums of claim 23, wherein the method further includes:
storing the particular data record in a database.

25. The one or more computer-readable storage mediums of claim 23, wherein a pop-up window provides a menu of operations configured to perform actions on a selected data record appearing within the pull-down display.

26. The one or more computer-readable storage mediums of claim 23, wherein the pull-down display is configured to display data records from two or more data sources including a database, a record source, and a dynamic record generator.

27. The one or more computer-readable storage mediums of claim 23, wherein one of the database manipulation options is to add a new data record to the database.

28. The one or more computer-readable storage mediums of claim 23, wherein one of the database manipulation options is to delete a data record from the database.

29. The one or more computer-readable storage mediums of claim 23, wherein one of the database manipulation options is to rename a data record.

30. The one or more computer-readable storage mediums of claim 23, wherein an identification of whether a first data record is selected in the pull-down display is presented proximate to the first data record.

31. The one or more computer-readable storage mediums of claim 23, wherein the pull-down display is configured to receive a command to select selecting multiple data records as a group.

32. The one or more computer-readable storage mediums of claim 23, wherein the pull-down display identification of whether each of the plurality of data records is selected includes separate checkbox interface items corresponding to each of the one or more data records, wherein multiple checkbox interface items are configured to be concurrently selected, and wherein data records selected through their associated checkbox interface items are used as data by a software application.

33. The one or more computer-readable storage mediums of claim 23, wherein the overview indicator includes a checkbox, and wherein the button includes an icon.

34. A computer-implemented graphical user interface for selecting from among a plurality of data records accessed from a database via a query, comprising:
a button within a window of the graphical user interface, wherein the button is a pull-down control button that includes an overview indicator that displays an unselected state when no data records are selected, and a selected state when at least one data record is selected;
a pull-down display within the window when a button selection is received, wherein the pull-down display includes a list of the plurality of data records and a selectable control for each data record;
a display of one or more database manipulation options based upon a command from the pull-down display, wherein a data record in the database is manipulated when an option is selected; and
wherein the overview indicator is displayed when the pull-down display is closed, wherein the overview indicator indicates whether any data records on the list are in the selected state.

* * * * *

UNITED STATES PATENT AND TRADEMARK OFFICE
CERTIFICATE OF CORRECTION

PATENT NO. : 8,069,419 B2  Page 1 of 1
APPLICATION NO. : 09/837047
DATED : November 29, 2011
INVENTOR(S) : Sanders et al.

It is certified that error appears in the above-identified patent and that said Letters Patent is hereby corrected as shown below:

In column 14, line 26, delete "selecting".

Signed and Sealed this
Tenth Day of January, 2012

David J. Kappos
*Director of the United States Patent and Trademark Office*